Figures 1, 2:
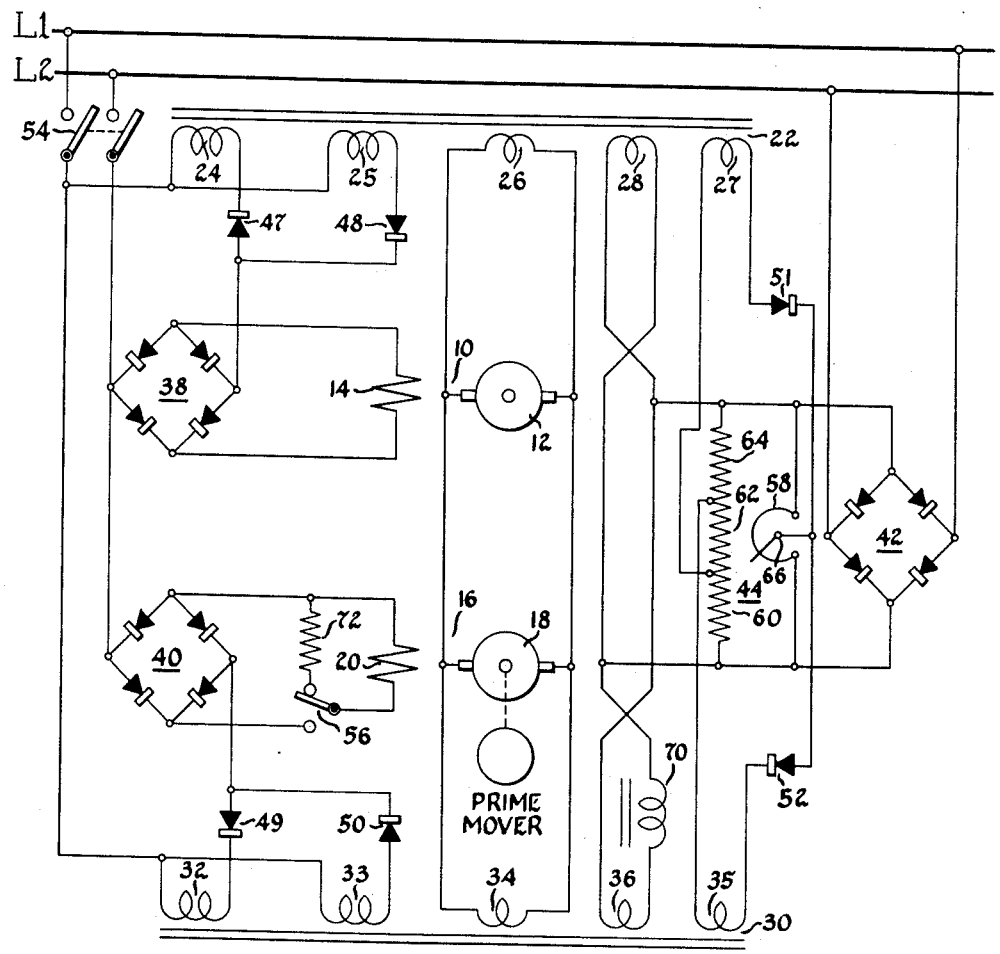

Feb. 26, 1957     D. W. FATH ET AL     2,783,424
SATURABLE REACTOR WARD LEONARD CONTROL SYSTEM
Filed June 11, 1954

Inventors.
Douglas W. Fath
Fred D. Horner, Jr.
By Grover A. Frater
Attorney

United States Patent Office 2,783,424
Patented Feb. 26, 1957

2,783,424

SATURABLE REACTOR WARD LEONARD CONTROL SYSTEM

Douglas W. Fath, Brookfield, and Fred S. Horner, Jr., Waukesha, Wis., assignors to Cutler-Hammer, Inc., Milwaukee, Wis., a corporation of Delaware Application June 11, 1954, Serial No. 436,107

11 Claims. (Cl. 318—145)

This invention relates to electrical control systems. In particular it relates to systems for controlling a plurality of electro-responsive elements in preselected relationship from a single control element.

An object of the invention is to provide simple and inexpensive but versatile electrical control systems for simultaneously controlling in selected relationship a plurality of electro-responsive elements.

Another object is to provide an improved control system for adjustable voltage, motor drive sets.

Another object is to provide control systems for electro-responsive elements in which the desired rate of change of energization of the elements is automatically controlled whereby the adjustable control element may be preset for subsequent operation at any desired degree of energization.

Another object is to provide control systems for adjustable voltage, motor drive sets and the like in which motor field excitation is maintained at full value during acceleration of the motor until rated armature voltage is reached and in which motor output torque is maximum during motor deceleration.

Other objects and advantages of the invention will hereinafter appear.

One embodiment of the invention is illustrated diagrammatically in Figure 1 of the drawing and will be described, it being understood that various modifications may be made in the embodiment illustrated and that various other embodiments of the invention may be made without departing from the scope of the appended claims.

Fig. 2 is a graph illustrating certain operating characteristics of the system of Fig. 1.

*The circuit connections*

Referring to Fig. 1, the system there shown comprises: a motor 10 having an armature 12 and a field winding 14; a generator 16 having an armature 18 and a field winding 20; a first magnetic amplifier 22 having power windings 24 and 25, control windings 26 and 27 and a bias winding 28; a second magnetic amplifier 30 having power windings 32 and 33, control windings 34 and 35 and a bias winding 36; bridge rectifier sets 38, 40 and 42; a Wheatstone bridge control circuit 44 and blocking rectifiers 47, 48, 49, 50, 51 and 52. The system is to be supplied with alternating electrical power from a suitable source represented by lines L1 and L2.

When switch 54 is closed, unidirectional power is supplied to field winding 14 of motor 10 through bridge rectifier 38 and, alternately, power winding 24 and rectifier 47 and power winding 25 and rectifier 48, respectively. When switch 56 is thrown to connect field winding 20 of generator 16 across the bridge rectifier 40, unidirectional power is supplied to field winding 20 through rectifier 40 and, alternately, through power winding 32 and rectifier 49 and power winding 33 and rectifier 50, respectively. The degree of energization of field windings 14 and 20 is determined by the degree of saturation of the cores of amplifiers 22 and 30, respectively, since the reactance of power windings 24, 25, 32 and 33 is determined by the degree of saturation of their associated amplifier cores. Bias windings 28 and 36 are connected in parallel across the unidirectional output terminals of bridge rectifier 42 and act to obtain a required degree of saturation in the cores of amplifiers 22 and 30, respectively. The input terminals of rectifier 42 are connected directly to lines L1 and L2 so that bias windings 28 and 36 are energized continuously when power is applied to said lines.

Control windings 26 and 34 are connected in parallel across armature 12 and armature 18, which are connected in loop circuit, and are energized in proportion to the output voltage of generator 16 and in a direction of polarity to oppose the saturating effect on the amplifier cores of bias windings 28 and 36, respectively. The control windings 27 and 35 are connected to output terminals of the Wheatstone bridge 44. This bridge comprises first, second, third and fourth impedance elements, such as resistors, which are designated 58, 60, 62 and 64, respectively. The first element 58 preferably comprises a potentiometer having a tap 66.

The control winding 27 is connected in series with blocking rectifier 51 between tap 66 and the junction of resistors 60 and 62. The other control winding 36 is connected in series with blocking rectifier 52 between tap 66 and the junction of resistors 62 and 64. Blocking rectifiers 51 and 52 are connected in opposite directions of polarity with respect to the output terminals of bridge rectifier 42 which are connected to the Wheatstone bridge at opposite ends of potentiometer 58.

*Operation of the circuit*

The speed of the motor 10 is adjusted by changing the setting of tap 66 of potentiometer 58. The tap is turned clockwise to increase motor speed. Assume that tap 66 is turned to the extreme counterclockwise position at the negative end of potentiometer 58 and that switch 54 is closed and that switch 56 is thrown to connect winding 20 across rectifier 40. Unidirectional output current from bridge rectifier 42 is applied to control windings 28 and 36 and tends to saturate the cores of the amplifiers. Since tap 66 is at the negative end of potentiometer 58, the tap is negatively polarized with respect to the junction between resistors 60 and 62 and the junction between resistors 62 and 64. Rectifier 51 is polarized so that no current can flow in winding 27. Thus winding 27 offers no opposition to saturation of the core of amplifier 22 by bias winding 28. The core will be substantially saturated and power windings 24 and 25 will offer only low reactance to the flow of exciting current to field winding 14 of the motor.

On the other hand, rectifier 52, being polarized oppositely from rectifier 51, permits full current flow in control winding 35. This winding acts to oppose the effect of bias winding 36. Accordingly the core of amplifier 30 is not saturated and power windings 32 and 33 offer substantial reactance to the flow of exciting current to field winding 20 of the generator.

This condition is illustrated by the solid line curves at the left side of the graph of Fig. 2. The condition illustrated by said solid line curves at the right side of the graph, full generator field excitation and minimum motor field excitation, results when tap 66 is rotated clockwise to the positive end of potentiometer 58. In this condition, the potential applied to rectifiers 51 and 52 is reversed. Rectifier 51 permits current flow but rectifier 52 does not. Thus the core of amplifier 30 is saturated and the core of amplifier 22 is not saturated.

When the tap 66 is set at a mid-voltage point of potentiometer 58, the tap is slightly negative with respect to the junction between resistors 62 and 64 and it is slightly positive with respect to the junction between resistors 60 and 62. A small amount of current is permitted to flow in both of control windings 27 and 35 and the condition results which is shown by the central portions of the solid curves of Fig. 2.

Thus the motor is controlled in accordance with the common practice of maintaining full motor field and increasing motor armature voltage to increase motor speed from zero to basic speed and maintaining full armature voltage and decreasing field excitation to effect an increase in motor speed above basic speed.

IR drop compensation for the generator 16 is provided by control winding 34. As generator output voltage decreases this winding is energized less and so offers less opposition to saturation of the amplifier core by bias winding 36.

The magnetic core of amplifier 22 may be oversaturated by bias winding 28 and the circuit including control winding 26, armature 12 and armature 18 and the control winding 26 itself, are arranged so that winding 26 is relatively ineffective to oppose saturation of the core of amplifier 22 until the output voltage of generator 16 has reached a high value. Winding 26 has greater resistance than does armature 12 so that current flow in winding 26 is low until the terminal voltage of armature 18 and the counter-electromotive force in armature 12 are high. Thus field winding 14 is substantially fully energized during periods in which motor 10 is accelerated to basic speed by increasing armature voltage.

The time required for the motor to accelerate up to basic speed is determined by the time constant of the energizing circuit of bias winding 36. This time constant is adjusted by the inclusion of proper impedance means, such as reactor 70, in said energizing circuit. The time for acceleration from basic speed to a higher speed is determined by the time constant of the energizing circuit of field winding 14 since speed increases above basic speed require reduction of the energization of field winding 14.

When the motor is to be stopped, switch 56 is thrown to connect generator field winding 20 across field discharge resistor 72. The motor deceleration time is determined by the time constant of this discharge circuit and a regenerative motor braking effect in which the motor, acting as a generator to return power to generator 16, brakes itself. During the regenerative braking period, the excitation of motor field 14 is automatically increased as a result of decrease in the energization of winding 26, at a rate which provides maximum regenerative braking without excessive circulating current flow in the loop circuit of armatures 12 and 18.

It may be desirable to alter the motor speed-field voltage curves as shown by the dotted line curves in Fig. 2 so that the excitation of one or both field windings is varied over a greater speed range. This may be done by increasing the impedance of element 62 with respect to one or both of elements 60 and 64.

We claim:

1. In an electrical controller, in combination, a pair of magnetic amplifiers each having an electrical output winding and a control winding, a Wheatstone bridge circuit having input terminals for connection to an electrical power source and having output terminals connected to the control windings of said magnetic amplifiers, means to unbalance said bridge and thus to apply control voltages of differing magnitude and opposite polarity to each of said control windings, and a pair of electro-responsive load elements each connected to the output winding of a respectively associated one of said magnetic amplifiers.

2. The combination defined in claim 1 in which each of said magnetic amplifiers has a second control winding, and in which is provided means to energize both of the second control windings as a function of the energization of said load elements.

3. The combination defined in claim 1 in which said bridge circuit and said means comprises first, second and third and fourth impedance elements connected in loop circuit in the order named and a pair of rectifiers connected in opposite directions of polarity in series circuit with a respectively associated one of said control windings, one of said control windings and rectifiers being connected from a tap on said first impedance element to a circuit point intermediate said third and fourth impedance elements and the other control winding and rectifier being connected between said tap and a circuit point intermediate said second and third impedance elements.

4. The combination defined in claim 3 in which each of said magnetic amplifiers has a second control winding, and in which is provided means to energize both of the second control windings as a function of the energization of said load elements.

5. The combination defined in claim 1 in which said load elements comprise the field windings of a generator and a motor, said generator and motor having armatures connected in loop circuit.

6. The combination defined in claim 5 in which each of said amplifiers is provided with a second control winding connected in parallel with the armature of said motor and said generator.

7. In combination, a loop-connected motor and generator each having a field winding, a first and a second saturable reactor connected for varying respectively the excitation of said field windings and each having a control winding, a blocking rectifier connected in series circuit with each of the control windings, and a Wheatstone bridge including means to unbalance said bridge connected to said control windings and said blocking rectifiers whereby said control windings are energized in accordance with the direction and degree of unbalance in said bridge.

8. In combination, a pair of magnetic amplifiers each having an output winding, means to saturate magnetically the amplifier core and a control winding energizable to oppose saturation of the core; a generator having a field winding connected to the output winding of one amplifier and having an armature; a motor having a field winding connected to the output winding of the other amplifier and having an armature; said armatures and control windings each being connected in shunt with one another; the control winding of said one amplifier being responsive to effect the saturation of its core as an inverse function of the output voltage of the generator armature; and the control winding of the other amplifier being responsive to effect saturation of its core as an inverse function of the speed of said motor.

9. The combination defined in claim 8, including a resistor and means to disconnect the field winding of the generator from the output winding of said one amplifier and connect said field winding of the generator in loop circuit with said resistor.

10. In combination, a pair of magnetic amplifiers each having an electrical output winding and a first and second control winding and a magnetically saturable core and means acting to oversaturate said core, primary signal means to apply an electrical control signal to the first control winding of each amplifier, a pair of electro-responsive load elements each connected to the output winding of a respectively associated one of said magnetic amplifiers, and means to afford a variable degree of energization of the second control winding of each amplifier as a function of the energization of said load elements.

11. The combination according to claim 10, in which said load elements comprise the field windings of a motor and a generator, and the last mentioned means comprises means to energize said second control windings as a function of the energization of said generator field winding and means including one of said second control windings for rendering one of said first control windings effective to control said motor field winding when the motor armature voltage reaches a predetermined value.

References Cited in the file of this patent

UNITED STATES PATENTS

| | | |
|---|---|---|
| 1,174,772 | Stiner | Mar. 7, 1916 |
| 2,414,936 | Edwards et al. | Jan. 28, 1947 |
| 2,559,538 | Jacobs | July 3, 1951 |
| 2,629,846 | Montgomery et al. | Feb. 24, 1953 |